US011882405B2

United States Patent

(12) United States Patent
Kelly et al.

(10) Patent No.: US 11,882,405 B2
(45) Date of Patent: Jan. 23, 2024

(54) ACOUSTIC EARWAX DETECTION

(71) Applicant: BOSE CORPORATION, Framingham, MA (US)

(72) Inventors: Liam Robert Kelly, Dorchester, MA (US); Peter McPhillips Moriarty, Brighton, MA (US); Ryan terMeulen, Watertown, MA (US)

(73) Assignee: BOSE CORPORATION, Framingham, MA (US)

( * ) Notice: Subject to any disclaimer, the term of this patent is extended or adjusted under 35 U.S.C. 154(b) by 135 days.

(21) Appl. No.: 17/357,560

(22) Filed: Jun. 24, 2021

(65) Prior Publication Data

US 2022/0417674 A1 Dec. 29, 2022

(51) Int. Cl.
*H04R 25/00* (2006.01)

(52) U.S. Cl.
CPC ......... *H04R 25/305* (2013.01); *H04R 25/652* (2013.01)

(58) Field of Classification Search
CPC .... H04R 25/305; H04R 25/30; H04R 25/652; H04R 25/654; H04R 29/00; H04R 29/001; H04R 1/1041; H04R 1/1016
USPC ........................................ 381/328, 325, 380
See application file for complete search history.

(56) References Cited

U.S. PATENT DOCUMENTS

| | | | | |
|---|---|---|---|---|
| 2014/0311499 A1 | 10/2014 | Lee et al. | |
| 2018/0124532 A1* | 5/2018 | Shetye | H04R 5/033 |
| 2021/0134318 A1* | 5/2021 | Harvey | H04R 1/1041 |
| 2021/0136503 A1* | 5/2021 | Harvey | H04R 29/001 |

FOREIGN PATENT DOCUMENTS

| | | | | |
|---|---|---|---|---|
| CN | 111225320 A * | 6/2020 | H04R 29/001 |
| EP | 3535984 A1 | 9/2019 | |
| WO | 2018085025 A1 | 5/2018 | |
| WO | 20210016899 A1 | 2/2021 | |
| WO | 2021089980 A1 | 5/2021 | |

OTHER PUBLICATIONS

International Search Report and Written Opinion for International Application No. PCT/US2022/025701 dated Jul. 29, 2022.

* cited by examiner

*Primary Examiner* — Ahmad F. Matar
*Assistant Examiner* — Sabrina Diaz
(74) *Attorney, Agent, or Firm* — Patterson + Sheridan, LLP

(57) ABSTRACT

Aspects of the present disclosure provide methods and apparatuses for determining a nozzle of an audio device is, at least partially blocked. More specifically, based on a measured transfer function between the driver and a microphone and an expected transfer function between the driver and the microphone, a blockage is detected. In response to the detected blockage, the user is notified.

20 Claims, 5 Drawing Sheets

ACOUSTIC EARWAX DETECTION

FIELD

Aspects of the present disclosure relate to determining when there is, at least, a partial blockage of a nozzle portion of a wearable audio output device. In aspects, the blockage is caused by the presence of earwax build up over time on the nozzle. As described in more detail herein, nozzle blockage negatively impacts a user's audio experience. In aspects, the user is alerted when the nozzle is, at least, partially blocked. The user may then take corrective action to clean the nozzle. As a result of removing the blockage, the user may resume experiencing the benefits offered by the wearable audio output device.

BACKGROUND

The nozzle of a device couples acoustic output delivered by the device to the user's ear. Blockage of the nozzle adversely effects the output heard by the user. As the nozzle becomes more blocked, less sound reaches the user. At an extreme, when the nozzle opening is completely blocked, no sound will reach the user. In aspects, for hearing aids, blockage of the nozzle results in decreased hearing aid benefit provided to the user. Methods are desired to determine when the nozzle is blocked.

SUMMARY

All examples and features mentioned herein can be combined in any technically possible manner.

Aspects of the present disclosure provide methods, non-transitory computer readable mediums, and audio output devices that determine when a nozzle of an audio output device is, at least, partially blocked. The blockage is determined based on a relationship between a driver and an in-ear system microphone of the wearable audio output device. More specifically, based on a measured transfer function between the driver and the in-ear system microphone and an expected transfer function between the driver and the in-ear system microphone, a blockage is detected. In response to the detected blockage, the user is notified.

Aspects provide a method for determining nozzle blockage of a device including a driver, a first microphone, and a comparison unit, comprising: outputting, by the driver, an audio signal having a known magnitude and frequency; comparing, by the comparison unit, a measured driver to first microphone transfer function associated with the audio signal and an expected driver to first microphone transfer function for the audio signal in a frequency range; predicting, by the comparison unit, the nozzle is at least partially blocked based, at least in part, on the comparison; and outputting, by the device, an indication the nozzle is at least partially blocked.

In aspects, the method further comprises determining, by a configuration unit, the device is one of in an ear a user or out of the ear of the user. In aspects, the comparing comprises determining the measured driver to first microphone transfer function is greater than the expected driver to first microphone transfer function by a threshold amount in the frequency range, the determining comprises determining the device is out of the ear of the user, and the predicting comprises predicting the nozzle is at least partially blocked based on the comparing and determination the device is out of the ear of the user. In aspects, the determining comprises determining the device is out of the ear of the user when the device is charging.

In aspects, the comparing comprises determining the measured driver to first microphone transfer function is less than the expected driver to first microphone transfer function by a threshold amount in the frequency range, the determining comprises determining the device is in the ear of the user, and the predicting comprises predicting the nozzle is at least partially blocked based on the comparing and determination the device is in the ear of the user. In aspects, the determining comprises determining the device is in the ear of the user when the device is determined to be outside of a charging case for a defined period of time.

In aspects, the frequency range is between 100 hertz to 1 kilohertz.

In aspects, the expected driver to first microphone transfer function for the audio signal in the frequency range is derived from population-based data.

In aspects, outputting the indication comprises transmitting the indication to a user device.

Certain aspects provide a wearable audio output device, comprising: a nozzle, driver, a first microphone, a comparison unit, each coupled to at least one processor and a memory, the memory including instructions executable by the at least one processor to cause the wearable audio output device to: output, by the driver, an audio signal having a known magnitude and frequency; compare, by the comparison unit, a measured driver to first microphone transfer function associated with the audio signal and an expected driver to first microphone transfer function for the audio signal in a frequency range; predict, by the comparison unit, the nozzle is at least partially blocked based, at least in part, on the comparison; and output, by the device, an indication the nozzle is at least partially blocked.

In aspects, the memory further includes instructions executable by the at least one processor to determine, by a configuration unit, the wearable audio output device is one of in an ear of a user or out of the ear of the user.

In aspects, in order to compare the measured driver to first microphone transfer function associated with the audio signal and the expected driver to first microphone transfer function for the audio signal in the frequency range, the memory further includes instructions executable by the at least one processor to cause the wearable audio output device to determine the measured driver to first microphone transfer function is greater than the expected driver to first microphone transfer function by a threshold amount in the frequency range, in order to determine the wearable audio output device is one of in the ear of the user or out of the ear of the user, the memory further includes instructions executable by the at least one processor to cause the wearable audio output device to determine the wearable audio output device is out of the ear of the user, and in order to predict the nozzle is at least partially blocked based, at least in part, on the comparison, the memory further includes instructions executable by the at least one processor to cause the wearable audio output device to predict the nozzle is at least partially blocked based on the comparing and determination the wearable audio output device is out of the ear of the user.

In aspects, in order to determine the wearable audio output device is one of in the ear of the user or out of the ear of the user, the memory further includes instructions executable by the at least one processor to cause the wearable audio output device to determine the wearable audio output device is out of the ear of the user when the wearable audio output device is charging.

In aspects, in order to compare the measured driver to first microphone transfer function associated with the audio signal and the expected driver to first microphone transfer function for the audio signal in the frequency range the memory further includes instructions executable by the at least one processor to cause the wearable audio output device to determine the measured driver to first microphone transfer function is less than the expected driver to first microphone transfer function by a threshold amount in the frequency range, in order to determine the wearable audio output device is one of in the ear of the user or out of the ear of the user, the memory further includes instructions executable by the at least one processor to cause the wearable audio output device to determine the wearable audio output device is in the ear of the user, and in order to predict the nozzle is at least partially blocked based, at least in part, on the comparison, the memory further includes instructions executable by the at least one processor to cause the wearable audio output device to predict the nozzle is at least partially blocked based on the comparing and determination the wearable audio output device is in the ear of the user.

In aspects, in order to determine the wearable audio output device is one of in the ear of the user or out of the ear of the user, the memory further includes instructions executable by the at least one processor to cause the wearable audio output device to determine the wearable audio output is in the ear of the user when the wearable audio output device is determined to be outside of a charging case for a defined period of time.

Certain aspect provide a computer-readable medium storing instructions which when executed by at least one processor performs a method for determining nozzle blockage of a wearable audio output device comprising: outputting, by a driver, an audio signal having a known magnitude and frequency; comparing, by a comparison unit, a measured driver to first microphone transfer function associated with the audio signal and an expected driver to first microphone transfer function for the audio signal in a frequency range; predicting, by a comparison unit, a nozzle is at least partially blocked based, at least in part, on the comparison; and outputting, by the wearable audio output device, an indication the nozzle is at least partially blocked. In aspects, the computer-readable medium is a non-transitory computer-readable medium.

In aspects, the method further comprises determining, by a configuration unit, the device is one of in an ear of an user or out of the ear of the user.

In aspects, the comparing comprises determining the measured driver to first microphone transfer function is greater than the expected driver to first microphone transfer function by a threshold amount in the frequency range, the determining comprises determining the device is out of the ear of the user, and the predicting comprises predicting the nozzle is at least partially blocked based on the comparing and determination the device is out of the ear of the user.

In aspects, the determining comprises determining the device is out of the ear of the user.

In aspects, the comparing comprises determining the measured driver to first microphone transfer function is less than the expected driver to first microphone transfer function by a threshold amount in the frequency range, the determining comprises determining the device is in the ear of the user, and the predicting comprises predicting the nozzle is at least partially blocked based on the comparing and determination the device is out of the ear of the user.

All aspects may be combined to detect a blockage in a nozzle portion of a wearable device and notify the user of said blockage.

DETAILED DESCRIPTION

In-ear audio devices, including in-canal hearing aids, are prone to excessive earwax buildup over time. One location where this buildup can cause issues is the nozzle of the device. The nozzle is where the acoustic output is coupled to the user's ear. As this buildup blocks more and more of the nozzle opening, the estimated relationship between the driver and the user's ear canal changes. This results in decreased functionality of the in-ear audio device and poorer hearing aid performance. For hearing aids, in extreme circumstances of complete blockage, no sound reaches the user resulting in no hearing assistance.

Figure 1:
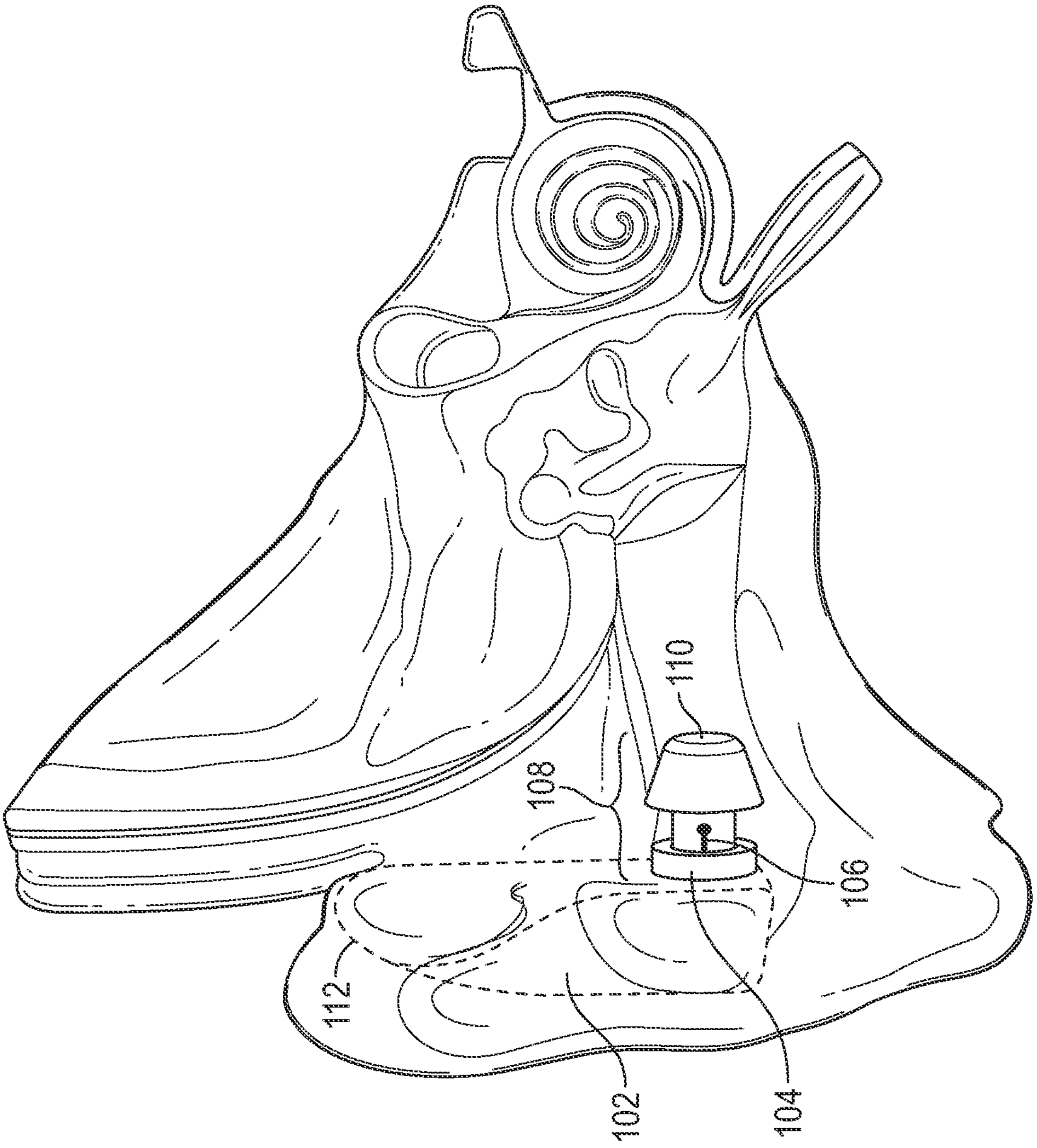
FIG. 1 illustrates an example behind-the-hear (BTE) hearing assistance device.

FIG. 1 illustrates an example hearing assistance device or hearing aid. The hearing assistance device includes a BTE portion 102 that fits around the user's ear. The BTE portion 102 is coupled to an in-ear driver 104. In aspects, the driver 104 is referred to as an in-ear audio output speaker, receiver, or transducer. The driver 104 is acoustically coupled to a first microphone 106 disposed inside the earbud 108. More specifically, the driver 104, first microphone 106, and ear drum share an acoustic volume.

The first microphone 106 is referred to as a system microphone or a feedback microphone. When the hearing aid is properly positioned in the user's ear, the first microphone 106 is located inside the user's ear canal. The first microphone 106 senses sound at the user's ear, the same way the user hears the sound. The nozzle opening 110 is, optionally, covered by a non-illustrated mesh to protect the housed components of in the earbud 108.

In FIG. 1, the BTE portion 102 is coupled to the driver 104 via a wire 112; however, the BTE portion may be wirelessly coupled to the driver.

While not illustrated, the BTE portion 102 of the device includes one or more of a second microphone, battery, amplifier, a sensor, at least one processor, and memory. The at least one processor includes a comparison unit for comparing a measured driver to system microphone transfer function to an expected driver to system microphone transfer function. The at least one processor also includes a configuration unit that determines the device is one of worn or otherwise positioned on the user's body (e.g., in the user's ear for an in-ear audio output device) or off of the user's body.

In aspects, the BTE portion 102 also includes a wireless communication unit for wirelessly communicating with external user devices (e.g., cell phones, personal wearable devices). The components in the BTE portion are all coupled together, directly or indirectly.

The second microphone hears noise before the user. The second microphone picks up sounds that are to be amplified by the device. The driver 104 outputs enhanced audio, picked up by the second microphone, to the user of the device.

Optionally, active noise reduction (ANR, or active noise cancellation (ANC)) processes the noise, creates anti-noise, and sends the resulting signal to the driver 104. In aspects, the second microphone is referred to as a feedforward microphone. For purposes of this disclosure, a feedforward ANR is optional.

According to aspects, the sensor can be an accelerometer, an inertial measurement unit (IMU) sensor, or any other sensor that can measure acceleration. Measurements from the sensor may be used to determine or proximate whether the in-ear audio device is either on the user's body (for example, positioned in-ear) or not on the user's body (for example, sitting on a table or in charging case). For example, when the sensor determines the in-ear audio device has not moved for a period of time, the processor may determine the device is off the user's body.

The memory and processor control the operations of the device. The memory stores program code for controlling the memory and processor. The memory may include Read Only Memory (ROM), a Random Access Memory (RAM), and/or a flash ROM. The processor controls the general operation of the device. The processor performs process and control for audio and/or data communication. In addition to the general operation, the processor is configured to take one or more actions to provide feedback to a user regarding if the nozzle of the device is, at least, partially blocked as described herein.

As noted above, the device includes a comparison unit. The comparison unit may be a processor that compares a measured driver to first microphone transfer function associated with an audio signal and an expected driver to first microphone transfer function for the audio signal in a frequency range. The comparison unit may determine the expected driver to first microphone transfer function based on population-based data for different configuration states stored in the memory. Additional, as noted above, the devices includes a configuration unit. The configuration unit may be a processor that determines if the device is in-ear or out-of-ear. Depending on the configuration of the device, the configuration unit may determine if the device is positioned on the user's body or off of the user's body. The configuration unit and the comparison unit may be part of the same or different processor.

In aspects, the device provides audio feedback regarding detected blockage of the nozzle. In aspects, a user device in communication with the audio device provides feedback regarding the detected blockage. The user device provides the feedback via an application ("app") running on the user device. In yet other aspects, both the device and the user device provide feedback. The feedback from the device and/or the user device may be an audio indication, wherein the indication alerts the user by prompt or sound/tone that the nozzle is at least partially blocked. In aspects, the user device provides a text indication, by way of an alert in an app associated with the device, a text message, and/or an email message, suggesting the user clean the nozzle.

The device illustrated in FIG. 1 is a BTE device; however, aspects of the present disclosure are not limited to detecting a blockage of the nozzle of only a BTE device or of any type of hearing assistance device. The methods described herein apply to a device having a physical configuration permitting the device to be worn such that ear wax may block a nozzle of an earbud. Examples include, and are not limited to, receiver-in-ear (RIC) devices, headphones with either one or two earpieces, over-the-head headphones, behind-the-neck headphones, headsets with communications microphones (e.g., boom microphones), wireless headsets, single earphones or pairs of earphones, audio eyeglass frames, as well as hats or helmets incorporating earpieces to enable audio communication and/or to enable ear protection. In some examples, in-ear headsets may include an earbud for each ear.

In operation with optional ANR, the feedforward microphone (on the BTE portion 102) detects sound from an external acoustic source. At least one processor generates anti-noise to cancel the detected sound based on the expected passive transfer function of sound past the earbud into the ear, and provides the anti-noise to the driver 104.

A microphone 106 is positioned in front of the acoustic driver 104, or more specifically, in a shared acoustic volume with the driver 104 and the ear drum of the wearer when worn, so that the microphone 106 detects sound as the user would. The microphone 106 also detects the sound from the acoustic source, to the extent it penetrates the earbud. At least one processor processes the sound and creates an anti-noise signal that is sent to the driver 104 to cancel the ambient noise.

The presence of both the first microphone 106 and the microphone outside of the user's ear (for example on the BTE portion 102) and permits noise suppression at a broader range of frequencies. For purposes of this disclosure, however, both microphones are not necessary. More specifically, the feedforward microphone is not required.

As described above, it is important that the system microphone accurately approximates what the user hears. Transfer function $G_{ij}$ refers to a physical transfer function from an input signal j to an output signal i. $G_{sd}$, therefore, refers to a transfer function from the voltage applied to the driver 104 to the voltage measured at the system microphone (e.g., the first microphone 106). As described below, nozzle blockage may be determined based on a comparison between a measured $G_{sd}$ and an expected $G_{sd}$.

Figure 2:
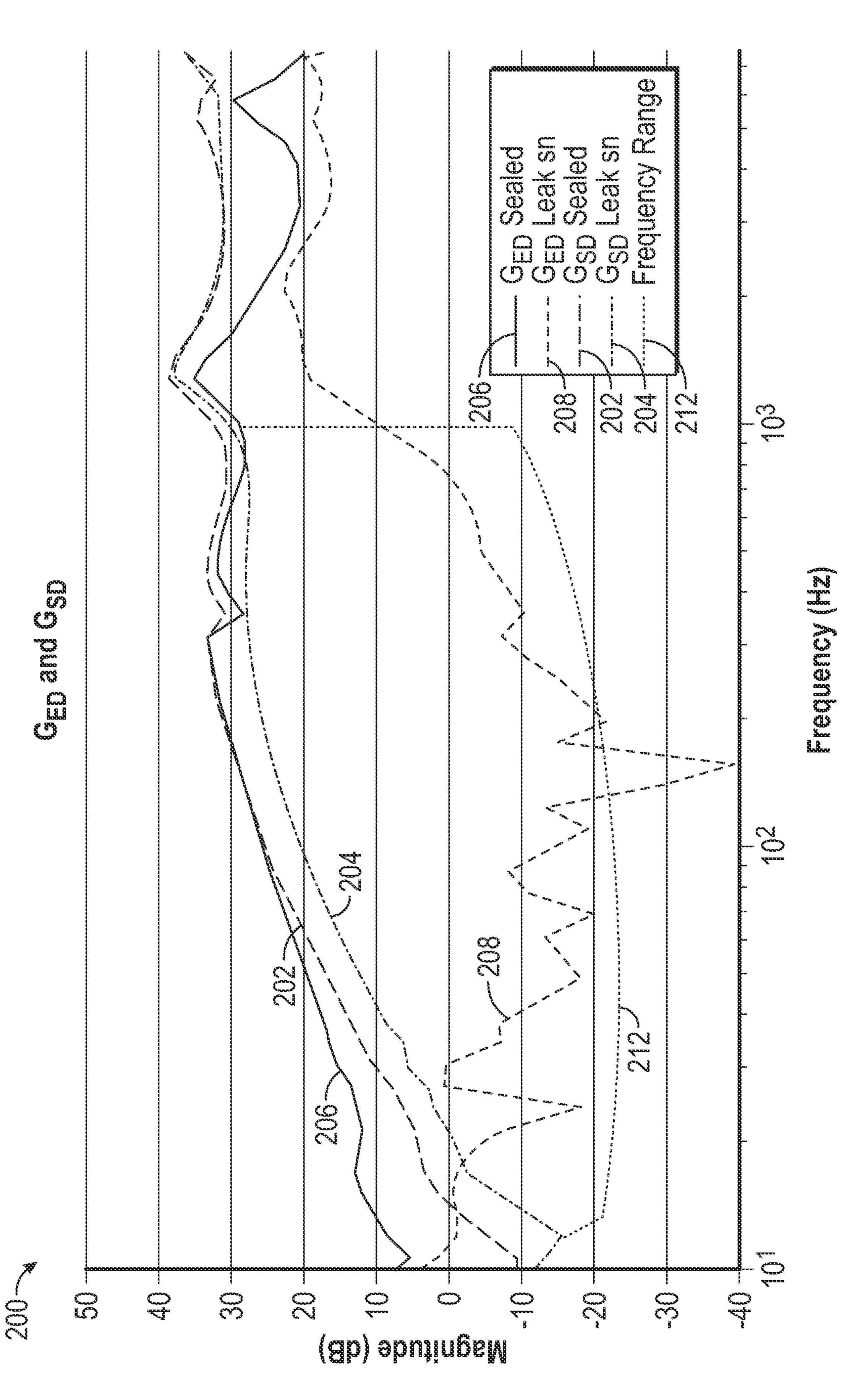
FIG. 2 illustrates an example plot of four transfer functions of an in-ear audio output device having a partially blocked nozzle.

FIG. 2 illustrates an example plot 200 of four transfer functions of an in-ear audio output device having a partially blocked nozzle. More specifically, the $G_{sd}$ at 202 represents the transfer function when the in-ear audio output device is positioned in the user's ear. The $G_{sd}$ at 204 represents the transfer function when the same in-ear audio output device is outside of the user's ear or otherwise not worn by the user.

FIG. 2 also illustrates $G_{ed}$ when the in-ear audio output device having a partially blocked nozzle is positioned in a user's ear and out of a user's ear. The $G_{ed}$ refers to a transfer function from the voltage applied to the driver 104 to the voltage measured at the user's ear per loud speaker signal. More specifically, the $G_{ed}$ at 206 represents the transfer function when the in-ear audio output device is positioned in the user's ear. The $G_{ed}$ at 208 represents the transfer function when the same in-ear audio output device is outside of the user's ear or otherwise not worn by the user.

As shown in the plot 200, there is approximately a 6 dB drop from 202 to 204 in the high frequency range 212 (e.g., the range encompassing frequencies less than 100 Hz to approximately 1 kHz). The drop from 202 to 204 in this frequency range indicates the in-ear first microphone (system microphone) 106 experienced a pressure decrease of about 6 dB when the device was outside of the user's ear as compared to positioned in the user's ear.

As shown in the plot 200, there is a more significant pressure decrease experienced at the user's ear, shown by $G_{ed}$, when the partially blocked nozzle is in the ear versus out of the ear. The pressure decrease is apparent in the frequency range 212 (e.g., the range encompassing frequencies less than 100 Hz to approximately 1 kHz). The dramatic dip in the $G_{sd}$ at 210 can be explained by the ear not hearing the loud speaker signal that is output by the driver because the in-ear device is not in the ear.

The approximately 6 dB change in pressure measured at the system microphone when the in-ear device was removed from the ear as compared to the much more dramatic change in pressure measured at the ear when the in-ear device was removed indicates the system microphone may not approximate what the ear hears when the nozzle is partially blocked.

Figure 3:
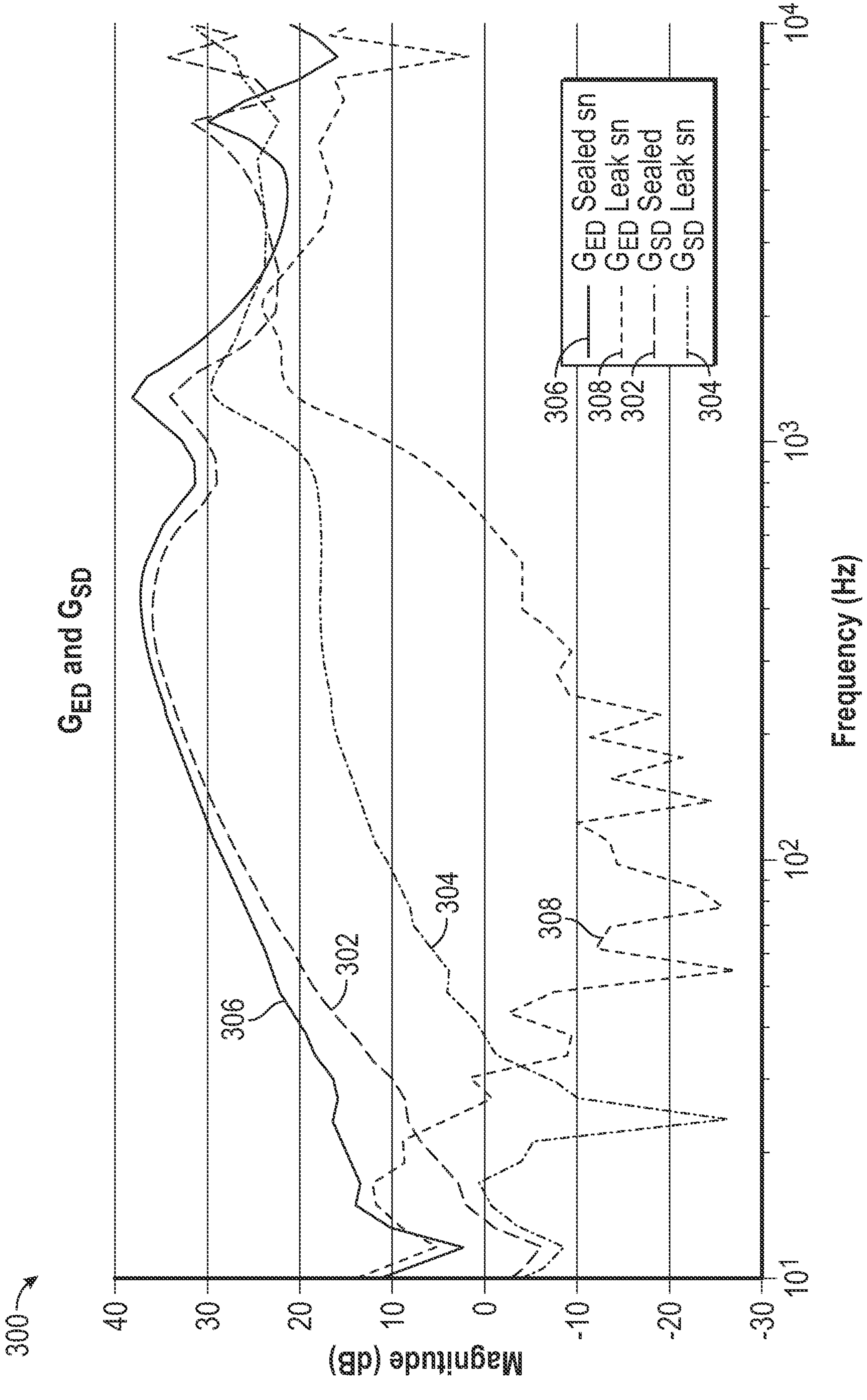
FIG. 3 illustrates an example plot of four transfer functions of an in-ear audio output device having a clean, unblocked nozzle.

FIG. 3 illustrates an example plot 300 of four transfer functions of an in-ear audio output device having a clean, unblocked nozzle. More specifically, the $G_{sd}$ 302 represents the transfer function when the in-ear audio output device, having an unblocked nozzle, is positioned in the user's ear. The $G_{sd}$ at 304 represents the transfer function when the same in-ear audio output device is outside of the user's ear or otherwise not worn by the user.

FIG. 3 also illustrates $G_{ed}$ when the in-ear audio output device having a clean, unblocked nozzle is positioned in a user's ear and out of a user's ear. More specifically, the $G_{ed}$ at 306 represents the transfer function when the in-ear audio output device is positioned in the user's ear. The $G_{ed}$ at 308 represents the transfer function when the same in-ear audio output device is outside of the user's ear or otherwise not worn by the user.

As shown in the plot 300, there is approximately a 15 dB drop from 302 to 304 in the low frequency range (e.g., the range encompassing frequencies less than 100 Hz to approximately 1 kHz). The drop from 302 to 304 indicates the in-ear first microphone (system microphone) 106 experienced a pressure decrease of about 15 dB when the device having a substantially unblocked nozzle is outside of the user's ear as compared to when the same device was positioned in the user's ear.

Based on plots 200 and 300, it is clear that, regardless of nozzle blockage, $G_{sd}$ is affected based on whether the in-ear audio device is positioned in the user's ear or out of the user's ear. $G_{sd}$ is higher when the in-ear audio output device is positioned in the user's ear as opposed to out of the user's ear. This is shown by $G_{sd}$ at 202 being greater than $G_{sd}$ at 204 and by $G_{sd}$ at 302 being greater than $G_{sd}$ at 304 for the range of frequencies of approximately 10 Hz and less than or equal to approximately 1 kHz. When the in-ear device is positioned in the user's ear, the nozzle is necessarily constrained by the ear canal regardless of the nozzle being partially blocked by earwax or not. When the in-ear audio device is outside of the user's ear, there is less pressure build up and, consequently, $G_{sd}$ decreases as compared to when the same device is positioned in the user's ear.

As described above, the purpose of the system microphone is to approximate what the user's ear hears. Blockages, such as those caused by ear wax, hinder the ability for the system microphone to function as intended. Accurately estimating what the user hears is helpful to efficiently implement ANR and other features, such as on-head detection and hearing assistance.

In one example, when a user removes a hearing aid from a charging case, that hearing aid needs to turn and begin amplifying external sound. If the hearing aid turns on too quickly and the user is still getting the device in to the ear, the BTE microphone may be more greatly coupled to the driver than designed. The driver is then sending pressure to the external microphone and an objectionable feedback loop may be formed that causes squealing. If ear wax prevents detecting the presence of a human ear, it may be a guessing game as to when to turn on, not only the ANR system, but also hearing assistance. An acoustical measurement performed by the system itself typically provides a powerful indicator of the ground truth as to whether there is a good seal, an ear present, and whether the acoustical system will behave appropriately. Because capacitance sensors of the skin, accelerometers have limitations, the measured acoustical path is important. If the measured acoustical path is compromised, for example, by ear wax, the system losses the ability to confidently estimate with acoustics whether there is a good seal with the tools that the system depends on. Therefore, ANR performance degrades and patient discomfort increases while because the system is not sure whether the device is properly donned and well seated in the user's ear.

Accordingly, systems and methods to determine when the nozzle is blocked (partially or completely) are beneficial so the user is prompted to clean the nozzle and the in-ear device may function more optimally because the system microphone is, again, able to approximate what the user hears.

Aspects of the present disclosure provide methods, systems, and apparatus to determine when a nozzle of an in-ear device has blockage based, at least in part, on a change in a measured transfer function associated with a voltage applied to the driver to the voltage measured at a microphone of the in-ear device. Aspects are described with respect to a system microphone; however, other microphones on the device may be used.

In an example of determining blockage, a driver 104 outputs an audio signal. In aspects, the driver is disposed in the ear canal, enclosed in the ear canal, or adjacent to the ear canal. The system microphone 106, located downstream of the driver in the sound path into the ear, measures the audio signal. A comparison unit compares the prior known or stored transfer function(s) from the driver to the system microphone collected based on population-based data for the known audio signal (e.g., having a known magnitude and frequency) with the measured transfer function from the driver to the system microphone. Certain differences are indicative of blockage in the nozzle. More specifically, certain differences or deviations in the measured transfer function as compared to the population-based transfer function are indicative of nozzle blockage.

Figure 4:
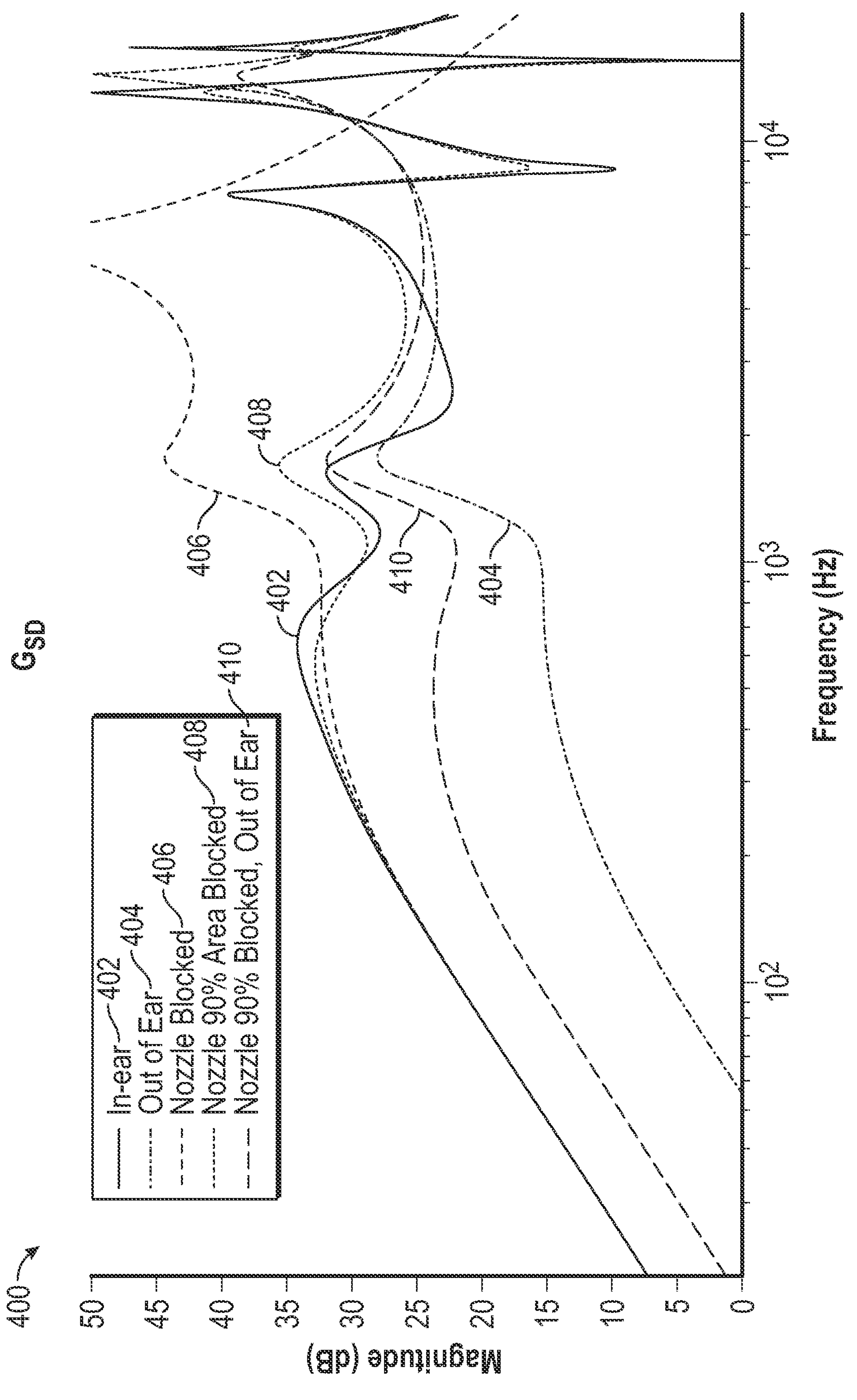
FIG. 4 illustrates example expected plots of $G_{sd}$ based on various configuration states and nozzle blockages for a given signal output by a driver, in accordance with aspects of the present disclosure.

FIG. 4 illustrates example expected plots of $G_{sd}$ based on various configuration states and nozzle blockages for a given signal output by a driver, in accordance with aspects of the present disclosure.

402 illustrates nominal in-ear $G_{sd}$ 404 illustrates a nominal out-of-ear $G_{sd}$. Nominal $G_{sd}$ refers to transfer function for a clean nozzle. At 404, there is approximately a 15-20 dB drop in pressure measured at the system microphone for a given signal as compared to 402, 406 illustrates $G_{sd}$ for a blocked nozzle that is in-ear. 408 illustrates $G_{sd}$ for a nozzle that is 90% blocked and in-ear. 410 illustrates $G_{sd}$ for a nozzle that is 90% blocked and out-of-ear. Over the range of frequencies of approximately 100 Hz to 1 kHz, the difference in a measured $G_{sd}$ as compared to an expected $G_{sd}$ is used to determine nozzle blockage.

Generally, the difference in $G_{sd}$ at 406 for a blocked nozzle disposed in-ear versus the nominal in-ear $G_{sd}$ 402 is less than the difference in $G_{sd}$ at 410 for a blocked nozzle that is out-of-ear versus the nominal out-of-ear $G_{sd}$ at 404. For example, over the range of frequencies of approximately 100 Hz to 1 kHz, the $G_{sd}$ at 410 is greater than the $G_{sd}$ at 404 by approximately 10 dB. In comparison, over a smaller range of frequencies, the $G_{sd}$ at 406 for a blocked nozzle is less than the nominal $G_{sd}$ at 402.

Therefore, in aspects, it is helpful to know the state or configuration of the device. The state or configuration of the device refers to if the in-ear device is in-ear or out-of-ear. As shown by the plots 200, 300, and 400, the transfer functions vary based on whether the device is in-ear or out-of-ear. As shown in plot 400, by $G_{sd}$ at 404 and $G_{sd}$ at 410, it may be easier to identify with increased confidence partial nozzle blockage when the device is out-of-ear.

The comparison unit of the device may be programmed to include population-based data including an expected transfer function for known sounds when the device is in-ear as well as population-based data including an expected transfer function for known sounds when the device is out-of-ear. In an example, this may correspond to plots 402 and 404, respectively. Based on the state of the device, the comparison unit compares a measured transfer function with the associated, stored transfer function.

The configuration unit may determine the state or configuration of the device in many ways. In an aspect, the configuration unit may determine the in-ear audio device out-of-ear when it is electrically coupled to a charging case or otherwise being charged. In an example, when the device is determined not to be electrically coupled to a charging case and after the passage of a certain amount of time, the device may assume it is ii-ear. In an example, 30 seconds after the device is removed from the charging case may be enough time for the user to put the device on.

In another aspect, the configuration unit may determine the in-ear audio device is out-of-ear when a sensor on the device determines a lack of movement or acceleration for a period of time. In aspects, the app on the user device receives user input confirming the device is out-of-ear or confirming the device is in-ear. In yet other aspects, the app prompts the user to place the in-ear device on a table with the nozzle facing upward. The user may confirm placement in accordance with the instructions via the app such that the device knows it is out-of-ear. In aspects, the app prompts the user to cover the nozzle opening with their finger. The user may confirm finger placement via the app simulating the nozzle being in-ear. The user may confirm their finger has been removed and is no longer covering the nozzle via the app so the devices knows it is out-of-ear.

Once the configuration of the device is determined, the driver outputs a tone or sound and the $G_{sd}$ is measured. Based on the configuration (in-ear or out-of-ear), the measured $G_{sd}$ is compared to an expected $G_{sd}$ for the configuration. Based on the comparison, the device identifies a nozzle blockage.

In an example, the device is determined to be out-of-ear. In this scenario, the measured $G_{sd}$ is compared to a nominal out-of-ear $G_{sd}$ such as 404. If the measured $G_{sd}$ is greater than the nominal out-of-ear $G_{sd}$ by a threshold determined for the out-of-ear scenario, the nozzle is determined to be blocked. The threshold amount for the out-of-ear scenario may be approximately 10 dB. In aspects, the measured $G_{sd}$ of the partially blocked nozzle may be similar to plot 410 and the comparison is performed over the range of frequencies between about 100 Hz to about 1 kHz.

In an example, the device is determined to be in-ear. In this scenario, the measured $G_{sd}$ is compared to a nominal in-ear $G_{sd}$ such as 402. If the measured $G_{sd}$ is less than the nominal in-ear $G_{sd}$ by a threshold determined for the in-ear scenario, the nozzle is determined to be blocked. The threshold amount for the in-ear configuration may be less than the threshold difference for the out-of-ear configuration. In aspects, the measured $G_{sd}$ of the partially blocked nozzle may resemble plot 408 and the comparison is performed over a smaller range of frequencies than the out-of-ear configuration.

Figure 5:
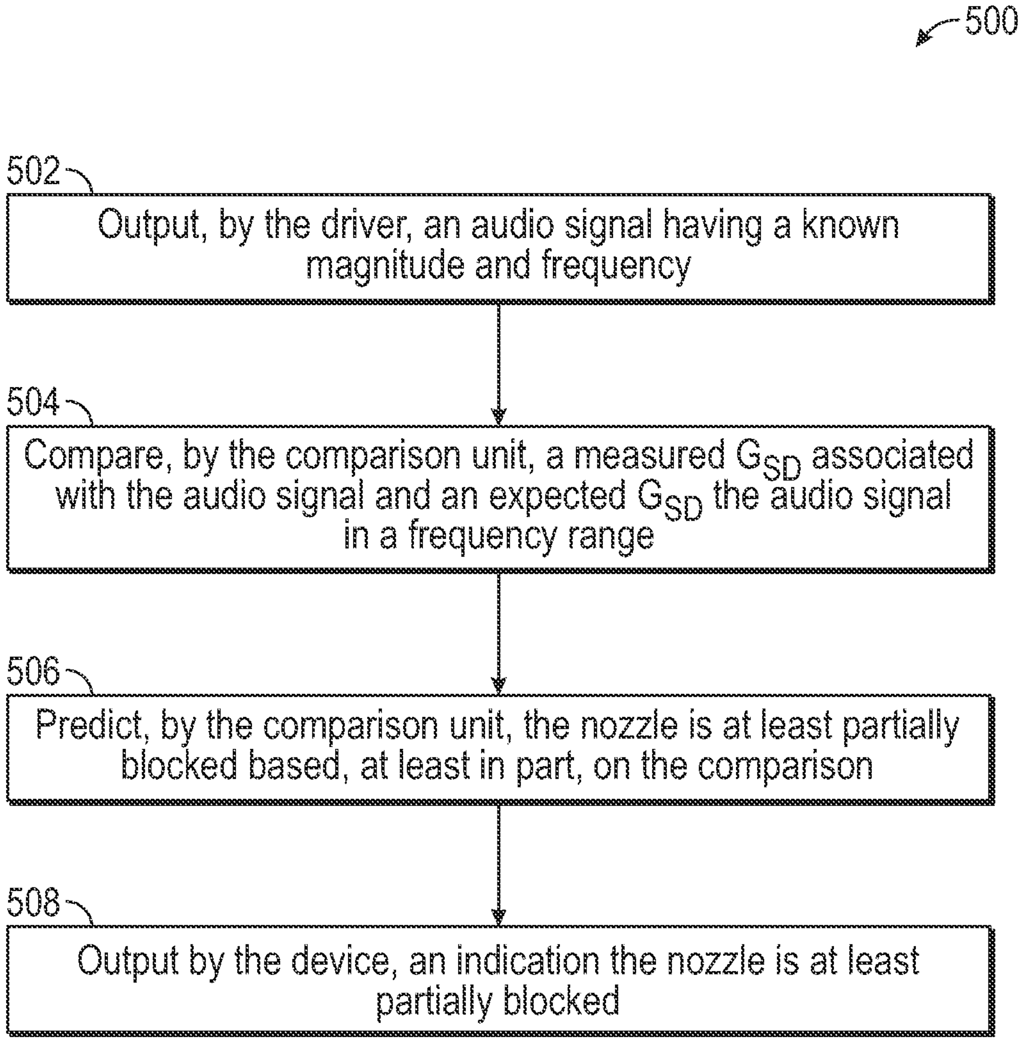
FIG. 5 illustrates example operations for detecting nozzle blockage in accordance with aspects of the present disclosure.

FIG. 5 illustrates example operations for detecting nozzle blockage and informing the user of the blockage, in accordance with aspects of the present disclosure.

At 502, a driver of the audio output device, outputs an audio signal having a known magnitude and frequency.

At 504, a comparison unit of the audio output devices, compares a measured driver to first microphone transfer function associated with the audio signal and an expected driver to first microphone transfer function for the audio signal in a frequency range. In aspects, the first microphone may be a system microphone that is disposed in the user's ear canal when the device is in-ear. The frequency range may be approximately 100 Hz to 1 kHz. In aspect, a smaller frequency range is used when the device is determined to be in-ear. Aspects are described with respect to a frequency range of 100 Hz to 1 kHz as an example. The concepts described herein may apply to other ranges of frequencies and are not limited to a frequency range of 100 Hz to 1 kHz.

At 506, the comparison unit predicts the nozzle is at least partially blocked based, at least in part, on the comparison.

At 508, the device outputs an indication the nozzle is at least partially blocked. The device may provide an audio that indicates the user should clean the nozzle, or more specifically, the ear tip that leads to the nozzle. Additionally or alternatively, the device may transmit an indication to be output to the user via a user device.

In aspects, the device is out-of-ear. The measured $G_{sd}$ is greater than the expected $G_{sd}$ by a threshold amount in the frequency range. The device estimates the nozzle is at least partially blocked based on the comparison of $G_{sd}$ and determination that the device is out-of-ear.

In aspects, the device is in-ear. The measured $G_{sd}$ is less than the expected $G_{sd}$ by a threshold amount in the frequency range. The device estimates the nozzle is at least partially blocked based on the comparison of $G_{sd}$ and the determination that the device is out-of-ear.

By making the user aware of nozzle blockage, the user can clean the nozzle and the device may operate more optimally resulting in a better user experience.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

The flowchart and diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method for determining nozzle blockage of a device including a driver, a first microphone, a configuration unit, and a comparison unit, comprising:
- outputting, by the driver, an audio signal having a known magnitude and frequency;
- determining, by the configuration unit, the device is one of in an ear a user or out of the ear of the user;
- comparing, by the comparison unit, a measured driver to first microphone transfer function associated with the audio signal and an expected driver to first microphone transfer function for the audio signal in a frequency range, wherein the frequency range comprises a first range of frequencies between 100 hertz and 1 kilohertz when the device is out of the ear of the user, and wherein the frequency range comprises a second range of frequencies when the device is in the ear of the user, and wherein the second range of frequencies is smaller than the first range of frequencies;
- predicting, by the comparison unit, the nozzle is at least partially blocked based, at least in part, on the comparison; and
- outputting, by the device, an indication the nozzle is at least partially blocked.

2. The method of claim 1, wherein:
- the comparing comprises determining the measured driver to first microphone transfer function is greater than the expected driver to first microphone transfer function by a threshold amount in the frequency range;
- the determining comprises determining the device is out of the ear of the user; and
- the predicting comprises predicting the nozzle is at least partially blocked based on the comparing and determination the device is out of the ear of the user.

3. The method of claim 2, wherein the determining comprises:
- determining the device is out of the ear of the user when the device is charging.

4. The method of claim 1, wherein:
- the comparing comprises determining the measured driver to first microphone transfer function is less than the expected driver to first microphone transfer function by a threshold amount in the frequency range;
- the determining comprises determining the device is in the ear of the user; and
- the predicting comprises predicting the nozzle is at least partially blocked based on the comparing and determination the device is in the ear of the user.

5. The method of claim 4, wherein the determining comprises:
- determining the device is in the ear of the user when the device is determined to be outside of a charging case for a defined period of time.

6. The method of claim 1, wherein the expected driver to first microphone transfer function for the audio signal in the frequency range is derived from population-based data.

7. The method of claim 1, wherein outputting the indication comprises:
- transmitting the indication to a user device.

8. The method of claim 1, wherein comparing the measured driver to first microphone transfer function associated with the audio signal and the expected driver to first microphone transfer function comprises
- comparing the measured driver to first microphone transfer function associated with the audio signal and a first expected transfer function if the device is determined to be out of the ear of the user, and
- comparing the measured driver to first microphone transfer function associated with the audio signal and a second expected transfer function, different from the first expected transfer function, if the device is determined to be in the ear of the user.

9. A wearable audio output device, comprising:
- a nozzle, driver, a first microphone, a configuration unit, and a comparison unit, each coupled to at least one processor and a memory, the memory including instructions executable by the at least one processor to cause the wearable audio output device to:
- output, by the driver, an audio signal having a known magnitude and frequency;
- determining, by the configuration unit, the wearable audio output device is one of in an ear a user or out of the ear of the user;
- compare, by the comparison unit, a measured driver to first microphone transfer function associated with the audio signal and an expected driver to first microphone transfer function for the audio signal in a frequency range, wherein the frequency range comprises a first range of frequencies between 100 hertz and 1 kilohertz when the wearable audio output device is out of the ear of the user, and wherein the frequency range comprises a second range of frequencies when the wearable audio output device is in the ear of the user, and wherein the second range of frequencies is smaller than the first range of frequencies;
- predict, by the comparison unit, the nozzle is at least partially blocked based, at least in part, on the comparison; and
- output, by the wearable audio output device, an indication the nozzle is at least partially blocked.

10. The wearable audio output device of claim 9, wherein:

in order to compare the measured driver to first microphone transfer function associated with the audio signal and the expected driver to first microphone transfer function for the audio signal in the frequency range the memory further includes instructions executable by the at least one processor to cause the wearable audio output device to determine the measured driver to first microphone transfer function is greater than the expected driver to first microphone transfer function by a threshold amount in the frequency range;

in order to determine the wearable audio output device is one of in the ear of the user or out of the ear of the user, the memory further includes instructions executable by the at least one processor to cause the wearable audio output device to determine the wearable audio output device is out of the ear of the user; and in order to predict the nozzle is at least partially blocked based, at least in part, on the comparison, the memory further includes instructions executable by the at least one processor to cause the wearable audio output device to predict the nozzle is at least partially blocked based on the comparing and determination the wearable audio output device is out of the ear of the user.

11. The wearable audio output device of claim 10, wherein in order to determine the wearable audio output device is one of in the ear of the user or out of the ear of the user, the memory further includes instructions executable by the at least one processor to cause the wearable audio output device to determine the wearable audio output device is out of the ear of the user when the wearable audio output device is charging.

12. The wearable audio output device of claim 9, wherein:

in order to compare the measured driver to first microphone transfer function associated with the audio signal and the expected driver to first microphone transfer function for the audio signal in the frequency range the memory further includes instructions executable by the at least one processor to cause the wearable audio output device to determine the measured driver to first microphone transfer function is less than the expected driver to first microphone transfer function by a threshold amount in the frequency range;

in order to determine the wearable audio output device is one of in the ear of the user or out of the ear of the user, the memory further includes instructions executable by the at least one processor to cause the wearable audio output device to determine the wearable audio output device is in the ear of the user; and in order to predict the nozzle is at least partially blocked based, at least in part, on the comparison, the memory further includes instructions executable by the at least one processor to cause the wearable audio output device to predict the nozzle is at least partially blocked based on the comparing and determination the wearable audio output device is in the ear of the user.

13. The wearable audio output device of claim 12:

in order to determine the wearable audio output device is one of in the ear of the user or out of the ear of the user, the memory further includes instructions executable by the at least one processor to cause the wearable audio output device to determine the wearable audio output is in the ear of the user when the wearable audio output device is determined to be outside of a charging case for a defined period of time.

14. The wearable audio output device of claim 9, wherein the expected driver to first microphone transfer function for the audio signal comprises an out of ear transfer function when the wearable audio output device is determined to be out of the ear of the user, and wherein the expected driver to first microphone transfer function for the audio signal comprises an in ear transfer function, different from the out of ear transfer function, when the wearable audio output device is determined to be in the ear of the user.

15. The wearable audio output device of claim 9, wherein the expected driver to first microphone transfer function for the audio signal in the frequency range is derived from population-based data.

16. A computer-readable medium storing instructions which when executed by at least one processor performs a method for determining nozzle blockage of a wearable audio output device comprising:

outputting, by a driver, an audio signal having a known magnitude and frequency;

determining, by a configuration unit, the wearable audio output device is one of in an ear a user or out of the ear of the user;

comparing, by a comparison unit, a measured driver to first microphone transfer function associated with the audio signal and an expected driver to first microphone transfer function for the audio signal in a frequency range, wherein the frequency range comprises a first range of frequencies between 100 hertz and 1 kilohertz when the wearable audio output device is out of the ear of the user, and wherein the frequency range comprises a second range of frequencies when the wearable audio output is in the ear of the user, and wherein the second range of frequencies is smaller than the first range of frequencies;

predicting, by a comparison unit, a nozzle is at least partially blocked based, at least in part, on the comparison; and outputting, by the wearable audio output device, an indication the nozzle is at least partially blocked.

17. The computer-readable medium of claim 16, wherein:

the comparing comprises determining the measured driver to first microphone transfer function is greater than the expected driver to first microphone transfer function by a threshold amount in the frequency range;

the determining comprises determining the wearable audio output device is out of the ear of the user; and the predicting comprises predicting the nozzle is at least partially blocked based on the comparing and determination the wearable audio output device is out of the ear of the user.

18. The computer-readable medium of claim 17, wherein the determining comprises:

determining the wearable audio output device is out of the ear of the user when the wearable audio output device is charging.

19. The computer-readable medium of claim 16, wherein:

the comparing comprises determining the measured driver to first microphone transfer function is less than the expected driver to first microphone transfer function by a threshold amount in the frequency range;

the determining comprises determining the wearable audio output device is in the ear of the user; and the predicting comprises predicting the nozzle is at least partially blocked based on the comparing and determination the wearable audio output device is in the ear of the user.

20. The computer-readable medium of claim 16, wherein the expected driver to first microphone transfer function for the audio signal comprises an out of ear transfer function when the wearable audio output device is determined to be out of the ear of the user, and wherein the expected driver to first microphone transfer function for the audio signal comprises an in ear transfer function, different from the out of ear transfer function, when the wearable audio output device is determined to be in the ear of the user.

* * * * *